(12) United States Patent
Pehrson

(10) Patent No.: US 6,339,705 B1
(45) Date of Patent: Jan. 15, 2002

(54) MANAGEMENT OF MULTIPLE TYPES OF RADIO BASE STATIONS IN A TELECOMMUNICATION SYSTEM

(75) Inventor: Jens Pehrson, Tokyo (JP)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/178,819

(22) Filed: Oct. 26, 1998

(51) Int. Cl.[7] ............................................. H04M 11/00
(52) U.S. Cl. ...................... 455/419; 455/423; 455/507; 370/230
(58) Field of Search .................. 455/423, 424, 455/419, 418, 414, 561; 370/95.1, 335, 230, 101.1

(56) References Cited

U.S. PATENT DOCUMENTS

| | | | | |
|---|---|---|---|---|
| 6,021,333 A | * | 9/1995 | Anderson et al. ............ | 455/560 |
| 5,481,545 A | | 1/1996 | Maedjaja et al. .......... | 370/95.1 |
| 5,495,484 A | * | 2/1996 | Self et al. ................. | 370/101.1 |
| 5,504,935 A | * | 4/1996 | Vercauteren ............... | 455/56.1 |
| 5,519,706 A | * | 5/1996 | Bantz et al. ................ | 455/56.1 |
| 5,537,684 A | * | 7/1996 | Cassldy et al. ............ | 455/34.1 |
| 5,566,388 A | * | 10/1996 | Brame et al. .............. | 370/95.1 |
| 5,666,348 A | * | 9/1997 | Thornberg et al. .......... | 370/230 |
| 5,797,099 A | * | 8/1998 | Ejzak et al. ................ | 455/466 |
| 5,812,951 A | * | 9/1998 | Ganesan et al. ............ | 455/552 |
| 5,854,786 A | * | 12/1998 | Henderson et al. ......... | 370/335 |
| 5,946,634 A | * | 8/1999 | Korpela ...................... | 455/552 |
| 5,974,331 A | * | 10/1999 | Cook et al. ................. | 455/461 |
| 6,215,997 B1 | * | 4/2000 | Han ............................ | 455/423 |
| 6,058,314 A | * | 5/2000 | Seok et al. ................. | 455/507 |
| 6,073,029 A | * | 6/2000 | Smith et al. ................ | 455/560 |
| 6,275,691 B1 | * | 8/2000 | Lee et al. ................... | 455/412 |

FOREIGN PATENT DOCUMENTS

| | | | | |
|---|---|---|---|---|
| EP | 101971 | | 7/1999 | |
| GB | 2308777 A | * | 2/1997 | ............ H04Q/3/09 |
| JP | 08006770 A | * | 1/1996 | ............ H04Q/7/36 |

OTHER PUBLICATIONS

ETSI, Sophia Antipolis, France, "European Telecommunication Standard ETS 300 623", Digital Cellular Telecommunication System (Phase 2); Network Management (NM) Procedures and Messages on the A–Bis Interface (GSM 12.21), Jun. 1, 1996, pp. 1–28, XP–002107037.

I. S. Groves et al., "Third Generation Mobile Systems", *BT Technology Journal*, vol. 14, No. 3, Jul. 1, 1996, pp. 115–121, XP–000598161.

S. Covaci et al., "Java–Based Intelligent Agents for Open System Management", Proceedings of the 9th International Conference on Tools with Artificial Intelligence, ICTAI'97, Newport Beach, CA, Nov. 3–8, 1997, Nov. 3, 1997, pp. 492–501, XP–002083756, *Institute of Electrical and Electronics Engineers (IEEE)*.

S. Blau and J. Rooth, "AXD 301—A New Generation ATM Switching System", *Ericsson Review*, No. 1, 1998, pp. 10–17.

"The Java[198] Language: An Overview", http://java.sun.com/docs/overviews/java/java–overview–1.html, pp. 1–7.

* cited by examiner

*Primary Examiner*—William Trost
*Assistant Examiner*—Tilahun Gesesse
(74) *Attorney, Agent, or Firm*—Jenkens & Gilchrist, PC

(57) ABSTRACT

A method and system are disclosed for implementing management functions on both sides of a base station management interface (i.e., in both the base station manager and the base station) so that a plurality of different types of base stations can be managed by the same base station manager. The management service functions are allocated to the specific base station(s) involved. As such, each type of base station in the network can maintain all of the software needed to perform the base station management services (e.g., element management services). Consequently, one common base station manager can be used for the management of any type of base station. In other words, the base station manager can be considered as a generic base station manager, and any base station can be connected to the generic base station manager via a management interface.

22 Claims, 3 Drawing Sheets

MANAGEMENT OF MULTIPLE TYPES OF RADIO BASE STATIONS IN A TELECOMMUNICATION SYSTEM

BACKGROUND OF THE INVENTION

1. Technical Field of the Invention

The present invention relates in general to the telecommunications field and, in particular, to a method and system for managing radio base station (RBS) resources in a cellular communications network.

2. Description of Related Art

The radio air interface of the upcoming third generation mobile communication systems is presently being defined by the standardization committees of the European Telecommunications Standards Institute (ETSI) and the International Telecommunications Union (ITU). The ETSI third generation system is called the Universal Mobile Telephone System (UMTS), while the ITU system is called the International Mobile Telephone 2000 (IMT 2000). FIG. 1 is a diagram that illustrates the nodes or network elements and certain interfaces in a third generation cellular radio network (e.g., UMTS) as presently defined by the ETSI.

In accordance with the ETSI definition, the network 100 shown in FIG. 1 includes a mobile station 102 connected to one or more base stations 104a–n and/or 105a–n by a call control interface Uu 103. Each base station 104a–n and 105a–n is connected to a radio network controller (RNC) 106 or 108 by a respective traffic control interface Iub 107a–n or 109a–n. The RNCs 106 and 108 are connected to each other by an RNC interface Iur 110, and to a mobile services switching center (MSC) 112 by a respective traffic control interface Iu 111 and 113. The traffic control interfaces Iub 107a–n and 109a–n function primarily for ordering the BSs to set up radio connections to one or more MSs.

In addition to the interfaces shown in FIG. 1, which are used for call control, connection control, and radio network control, the network 100 also includes interfaces (not shown) used for management of the resources of the network and the nodes. As such, the term "management" in this context includes all of the control functions that are not directly related to the handling of calls and connections, such as, for example, network and network element configuration, fault and alarm supervision, performance monitoring, and collection of performance statistics data.

The ETSI has decided that the interfaces shown in FIG. 1 shall be standardized, so that it will be possible for a cellular network operator to purchase the network nodes (BSs, RNCs, MSC) from different system manufacturers (vendors). The process of standardizing the Iu, Iur and Iub traffic control interfaces has already begun. As such, these interfaces are based on known techniques, which have also been used for the Global System for Mobile Communications (GSM). All messages to be transferred over these interfaces are defined in the pertinent standard.

FIG. 2 is a diagram that illustrates a significant problem that exists for the developing third generation systems. Essentially, the problem is how to design the management interfaces, Mu, so that the management of a network with different vendors' BSs will be efficient. FIG. 2 shows a portion of the network 100 in FIG. 1 but in more detail. As shown in this illustrative example, the BSs 104a and 104b are from two different vendors and connected to another vendor's RNC (106). These connections have been made possible because the Iub interfaces 107a and 107b to the RNC 106 have been standardized and are exactly the same for both BSs. However, as described in more detail below, the management interfaces, $Mub_1$ (116a) and $Mub_2$ (116b), to a network operation center (e.g., Base Station Manager or BSM) 114 cannot be completely standardized. The above-described problem is further complicated, because the BSM 114 is from yet another different vendor.

For example, the messages to be transferred over the management interfaces, Mub, fall into two different categories: (1) standardized messages, which are used for the management of implementation-independent "managed objects"; and (2) vendor-specific messages, which are used for configuration, supervision and monitoring of the internal system components of the BSs, such as, for example, processors and switches. Currently, these messages cannot be specified in a standard, because the system components are implemented differently in the different vendors' BSs (and also in different types of BSs from a same vendor). One conclusion that can be made is that the interfaces, $Mub_1$ (116a) and $Mub_2$ (116b), can be used to transfer both standardized and vendor-specific messages. As such, each such Mub interface has one part that can be standardized, and one part that is different for BSs from different vendors.

Clearly, the network architecture shown in FIG. 2 has a fundamental problem, in that the Mub interfaces between the BSs (104a and 104b) and the BSM 114 are not completely standardized. Also, some of the messages to be conveyed over these management interfaces are vendor-specific. Consequently, it is virtually impossible to design one "state of the art" BSM that can handle the management of BSs of all different vendors.

A possible solution to the problem of non-standardized interfaces between such nodes is to split the Mub interfaces so that the standardized messages are sent to a common BSM, while the non-standard messages are sent to BSMs that are designed specifically for each type of BS provided by different system vendors. As such, what can be considered a "state of the art" third generation cellular network architecture is shown in FIG. 3.

FIG. 3 is a diagram that illustrates a proposed standard architecture for a third generation cellular network referred to as the UMTS Terrestrial Radio Access Network (UTRAN). The proposed UTRAN network management architecture shown in FIG. 3 includes a BSM System 115 in a multi-vendor UTRAN environment. The BSM System 115 includes a common $BSM_{common}$ 114 from vendor 4, a different $BSM_1$ 118 from vendor 1, and yet another different $BSM_2$ 120 from vendor 2. As shown, the main difference between the architectures shown in FIGS. 2 and 3 is that FIG. 3 splits the Mub interfaces so that the standardized messages are sent to a common BSM, while the non-standard messages are sent to the different vendors' BSMs. In other words, non-standard messages are sent between the BS 104a and the vendor-specific $BSM_1$ 118, and between the BS 104b and the vendor-specific $BSM_2$ 120 via the management interfaces $Mub_1$ 116a and $Mub_2$ 116b, respectively. The standard messages are sent between the two BSs 104a and 104b and the common $BSM_{common}$ 114 via the management interfaces $Mub_1$ 116a and $Mub_2$ 116b, respectively, and then split off and sent via a standard management interface $Mub_{standard}$ 117 to the common $BSM_{common}$ 114.

FIG. 4 is a diagram that illustrates an existing Base Station Subsystem (BSS) management architecture for the GSM in a multi-vendor environment. Clearly, the proposed UTRAN BSM management architecture shown in FIG. 3 is much more advanced than the GSM BSS management architecture shown in FIG. 4. For example, a GSM Abis interface contains both a standardized call handling interface (comparable to Iub in FIG. 3) and a management interface (comparable to Mub). However, the GSM network architecture is not very efficient, because the two BSMs (BSM1, BSM2) shown in FIG. 4 must be implemented in the BSC node and it is not possible to implement them separately (unlike the configuration shown in FIG. 3).

The GSM management architecture shown in FIG. 4 has severe shortcomings. For example, as a practical matter, it is virtually impossible to connect different vendors' BSs to the same BSC (similar to an RNC in the UMTS). The reason for this shortcoming is that most cellular equipment manufacturers have designed their GSM systems so that the BSMs for their respective BSs are executed on a proprietary (non-standard) computer system. In most cases, this proprietary computer system is the same one used for the traffic control functions in the BSC. Consequently, it is virtually impossible for a manufacturer to implement a structure based on the architecture shown in FIG. 4. As such, one vendor's BSM cannot be executed in a different vendor's BSC.

The ETSI UMTS expert group has suggested that the management interface, Mub, should be specified as an interface separate from the Iub. If implemented, that suggestion would improve the equipment compatibility problem considerably as compared to the GSM solution. As such, the architecture shown in FIG. 3 could then be implemented. The functional entities, $BSM_1$ (118) and $BSM_2$ (120), could then be implemented as completely separate nodes that could use any computer system. However, the architecture shown in FIG. 3 indicates that a certain degree of coordination will be needed so that the common management functions can be implemented in a uniform way.

The problem area that the present invention provides a solution for relates to the practical problem of trying to integrate, in a common processing system, the program modules that implement the functional entities $BSM_{common}$, $BSM_1$, $BSM_2$, etc. (e.g., one BSM for each type of BS). However, as mentioned earlier, as a practical matter, it is virtually impossible to accomplish the requisite equipment integration in the existing GSM architecture, because incompatible computer systems are used in the different vendors' BSCs. The UMTS management architecture currently being discussed in the ETSI will likely improve the situation, but there are still a number of significant problems that remain to be resolved.

For example, if each BSM in a "BSM System" is to be run in a separate computer, the cost of such a system will be relatively high. Furthermore, it is difficult to provide a uniform user interface for such a system comprising several computers, where each such computer is running a BSM for a specific type of BS. As another example, in order to be able to integrate BSMs from different vendors into one system, as shown in FIG. 3, the software modules have to be executable in the same computer. In principle, it should be possible to define a standard execution environment (e.g., Windows, Unix, etc.) for a BSM System, but this alternative is not realistic at the present time. Specifically, most GSM operators already use network management systems, and typically, they also want to use these existing systems for managing future UMTS networks. Moreover, the ETSI does not standardize implementation platforms, so it should not be readily assumed that it will be possible to implement an integrated base station management system, such as the one shown in FIG. 3. However, as described in detail below, the present invention successfully resolves the above-described problems.

SUMMARY OF THE INVENTION

In accordance with a preferred embodiment of the present invention, a method and system are provided for implementing management functions on both sides of a BSM interface (i.e., in both the BSM and the BS) so that a plurality of different types of BSs can be managed by the same BSM. The management service functions are allocated to the specific BS involved. As such, each type of BS can maintain all of the software needed to perform the base station management services (e.g., element management services). Consequently, one common BSM can be used for the management of any type of BS. In other words, the BSM can be considered as a generic BSM. In accordance with the teachings of the present invention, any BS can be connected to the generic BSM via an Mub interface.

An important technical advantage of the present invention is that a single base station manager can be used for management of all types of base stations.

Another important technical advantage of the present invention is that cellular operators can achieve efficient management of their radio access network, even if the network is composed of different types of base stations.

Yet another important technical advantage of the present invention is that base stations can be implemented differently in one cellular network in order to be optimized for different capacity requirements, such as base stations for macro-cells, micro-cells and pico-cells.

Still another important technical advantage of the present invention is that a cellular network operator can utilize base stations from different vendors using different system architectures (e.g., processors, switches, etc.).

Still another important technical advantage of the present invention is that a management system operator can log-in to a base station from any computer connected to a management data communication network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
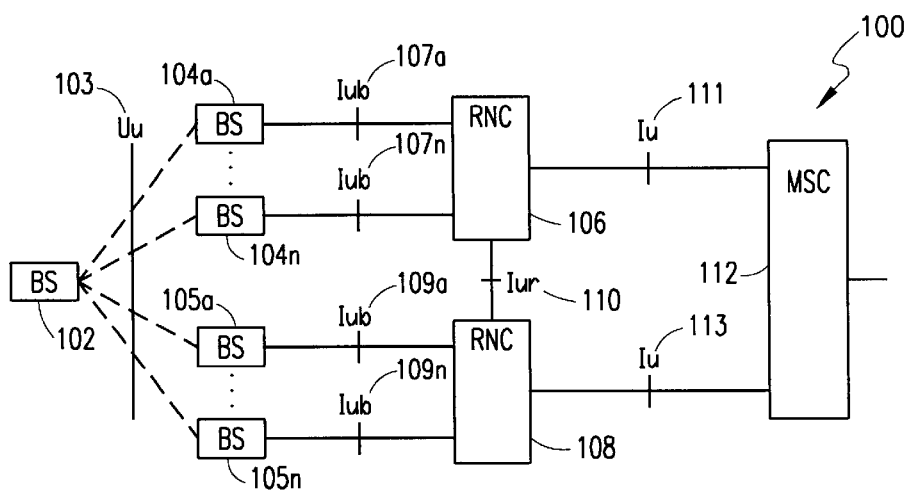
FIG. 1 is a diagram that illustrates the nodes or network elements and certain interfaces in a third generation cellular radio network as presently defined by the ETSI.
Figure 2:
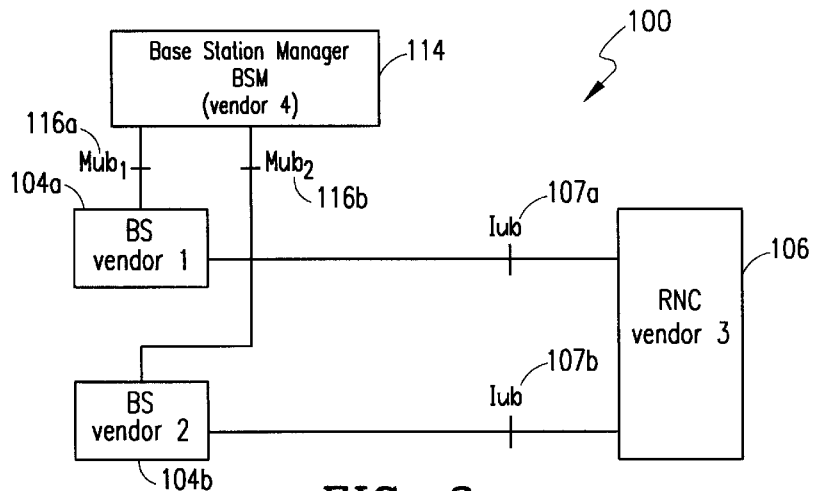
FIG. 2 is a diagram that illustrates a significant problem that exists for the developing third generation systems.
Figure 3:
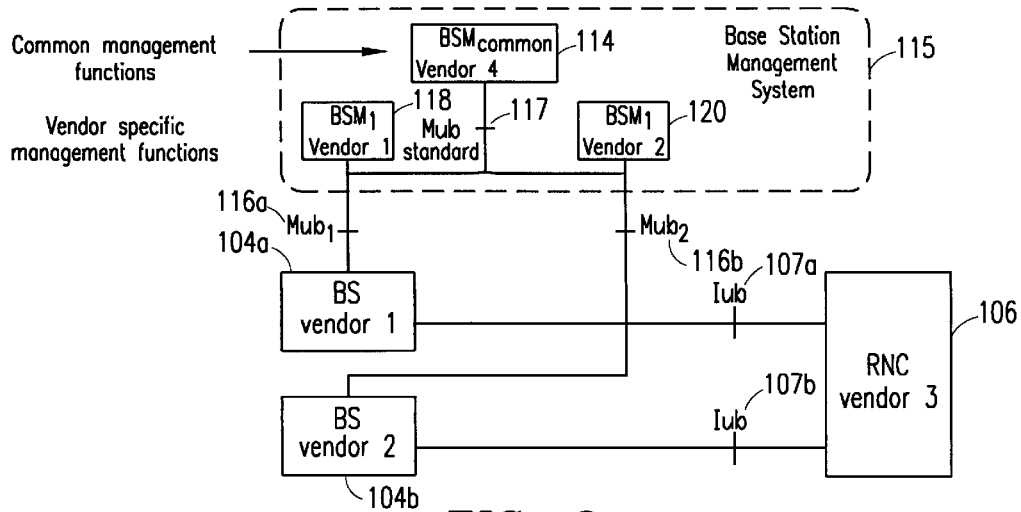
FIG. 3 is a diagram that illustrates a proposed standard architecture for a third generation cellular network.
Figure 4:
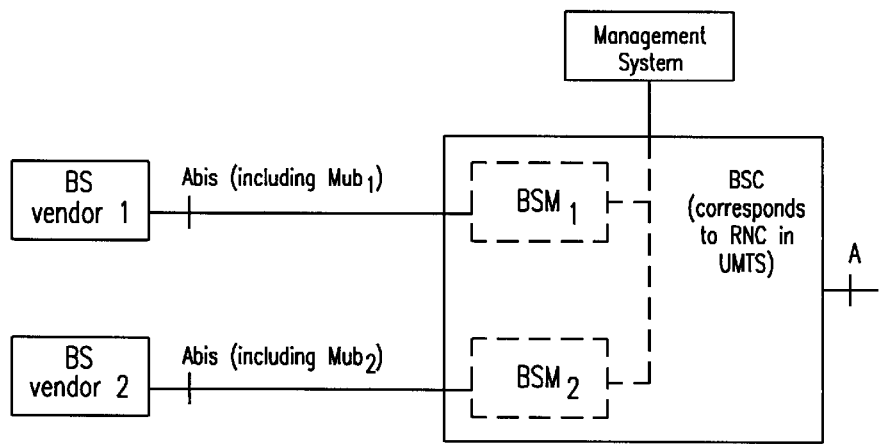
FIG. 4 is a diagram that illustrates an existing Base Station Subsystem management architecture for the GSM in a multi-vendor environment.

The preferred embodiment of the present invention and its advantages are best understood by referring to FIGS. 1–7 of the drawings, like numerals being used for like and corresponding parts of the various drawings.

Essentially, in accordance with a preferred embodiment of the present invention, a method and system are provided for implementing management functions on both sides of a BSM interface (i.e., in both the BSM and the BS) so that a plurality of different types of BSs can be managed by the same BSM. The management service functions are allocated to the specific BS involved. As such, each type of BS can maintain all of the software needed to perform the base station management services (e.g., element management services), as described below. Consequently, one common BSM can be used for the management of any type of BS. In other words, the BSM can be considered as a generic BSM. In accordance with the teachings of the present invention, any BS can be connected to the generic BSM via an Mub interface.

The generic BSM's management services software can be executed on any suitable computer platform. This software is composed mainly of software for implementing a management "user interface" (i.e., an interface that a system operator can use to perform management tasks). For example, a suitable software implementation of a generic BSM can be an industry standardized "Internet web-browser", such as the Netscape Navigator® or Microsoft Explorer®.

First, it would be useful to discuss some basic, pertinent points. The nodes in telecommunication networks (e.g., cellular radio networks) are commonly referred to as "network elements". Each such network element has two types of external interfaces: (1) traffic control interfaces, which are used, for example, for setting up speech connections; and (2) management interfaces, which are used for management of the network elements. Numerous management tasks need to be performed in order to make a network element function properly, such as, for example, loading programs and configuration data, monitoring alarms and fault notifications, monitoring system performance, and collecting performance statistics data. Such management tasks are typically performed remotely from a management system that is connected to the management interfaces of a large number of network elements via a management data communication network. Such a management system is often referred to as an "element manager." As such, the present invention may be considered as a type of element manager for BSs, or a BSM (e.g., implemented as one or more software modules being executed in a computer).

For the third generation cellular systems (UMTS/IMT 2000), the ETSI UMTS architecture group has proposed that the standard shall define a BS with the two external network interfaces: Iub and Mub. The Iub network interface would function to connect a BS with an RNC. Essentially, the Iub is a traffic control interface, which is used primarily for ordering the BS to set up radio connections with MSs. The Mub network interface would function to connect a BS with a BSM system. Essentially, the Mub is to be a management interface, which is used primarily for management of the BS.

Figure 5:
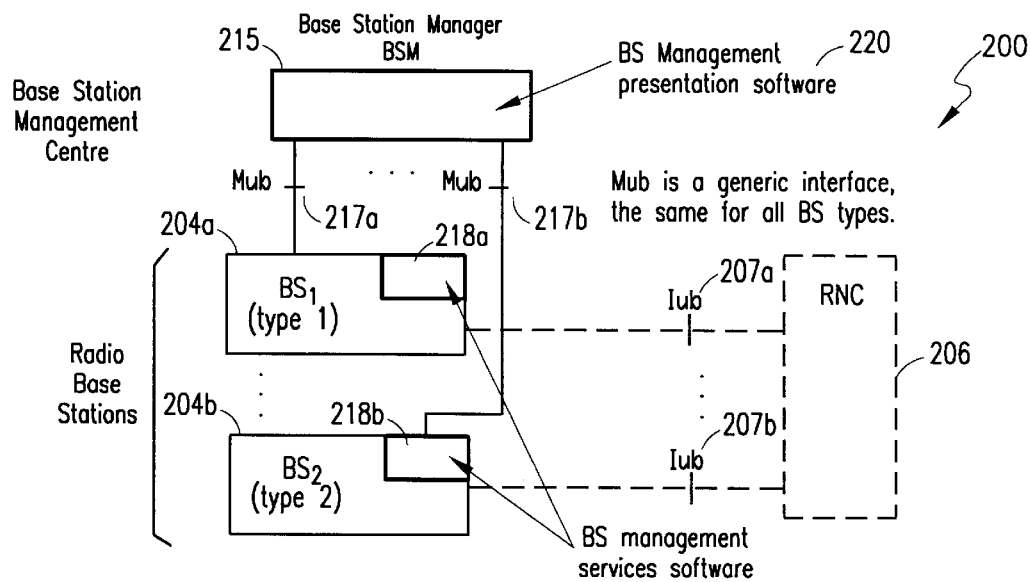
FIG. 5 is a diagram that illustrates a BSM system that can be used to implement a preferred embodiment of the present invention.

Specifically, FIG. 5 is a diagram that illustrates a BSM system (BSM for short) 200 that can be used to implement a preferred embodiment of the present invention. For the exemplary system shown, a plurality of BSs (e.g., $BS_1$ 204a, $BS_2$ 204b) of different types are connected to an RNC 206 via a respective standardized traffic control interface, Iub 207a and Iub 207b. These BSs are also connected to a BSM 215 via a respective management interface, Mub 217a and 217b. Although only two BSs and corresponding sets of traffic control and management interfaces are shown, this particular arrangement is for illustrative purposes only and not intended to impose an unnecessary limitation on the present invention. For example, several different types of BSs with corresponding sets of traffic control and management interfaces could be shown and thus included within the scope of the present invention.

Each BS (204a–204b) includes the requisite management services software for its own management functions (218a–218b) so that connecting another, different type of BS (e.g., $BS_3$—a third type of BS) will not require a redesign of the BSM 215 in use. Preferably, for this embodiment, the BSM 215 includes generic BS management presentation software functions 220.

As described above, for this exemplary embodiment, the management services software is maintained in the respective BS and is typically executed in the BS's control computer. However, as an alternative approach, the management services software could be executed in the same computer in which the user interface software is executed for a BS. This alternative approach advantageously achieves an efficient implementation with a fast interactive response, and allows the use of sophisticated graphical functions. As such, the details about this approach are described below with respect to FIGS. 6 and 7.

In the preferred embodiment, with the management services software stored in each BS, when an operator in a BSM operations center (not shown) prepares to initiate performance of a management task for a specific BS (e.g., 204a), the generic BSM software 220 establishes communication with this BS via a management data communication network (not shown). The generic BSM software 220 queries the BS (204a) to determine if it is necessary to upload BS-specific software in order to perform the management task involved. In response, the BS (204a) sends a message to the BSM indicating which software modules are needed to perform the task involved. The BSM 215 then directly requests the BS (204a) to send the needed software modules to the BSM.

Alternatively, in a different aspect of the preferred embodiment, a more efficient approach is for the BSM 215 to first check locally to determine if any of the needed software modules have already been loaded and are still stored in a local cache memory. If so, the BSM 215 can request the BS (e.g., 204a) to send only the software modules that are needed but missing in local storage (or cached with an out-of-date revision status).

When all of the software modules needed for the management task are received from the BS, the BSM 215 directs the local computer in which the software modules reside to begin executing the software for the task involved. However, if, for example, the executing processor is not compatible with the computing environment required by a software module being used, the operating system or processor type could differ from the architecture assumed when the BSM software was designed. This potential problem can be solved by using a conventional software technique, such as, for example, a technique described for JavaSoft® (see, for example, "The Java language: An overview" on the Internet at "http://java.sun.com/docs/overviews/java/java-overview-1.html"). In other words, the software modules can be written in a language (e.g., Java) that can be interpreted by a "virtual execution machine" for that language in the BSM 215 computer.

Such "virtual execution machines" for Java are currently available for most commercial computers and operating systems. These "machines" can create a uniform execution environment for the BSM software modules, which functions independently of the processor and operating system in use for the BSM computer. Consequently, a BSM software module can be executed in any BSM computer that has a virtual execution machine for the software language being used (e.g., Java).

Figure 6:
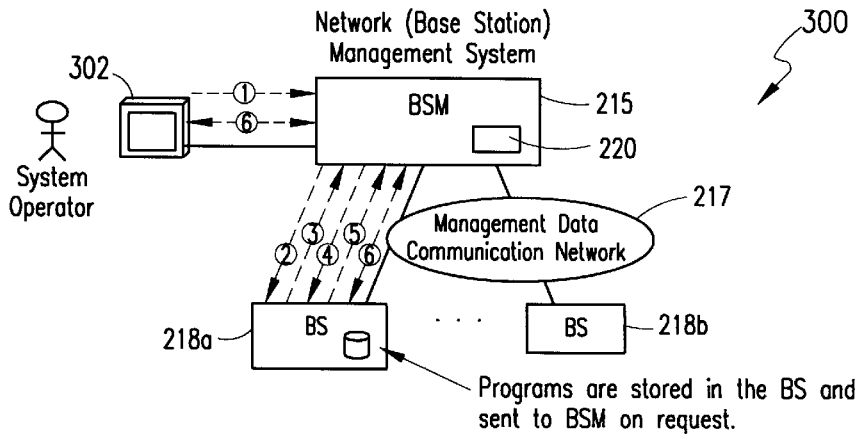
FIG. 6 is a block diagram of an exemplary system that can be used to implement the preferred embodiment of the present invention.
Figure 7:
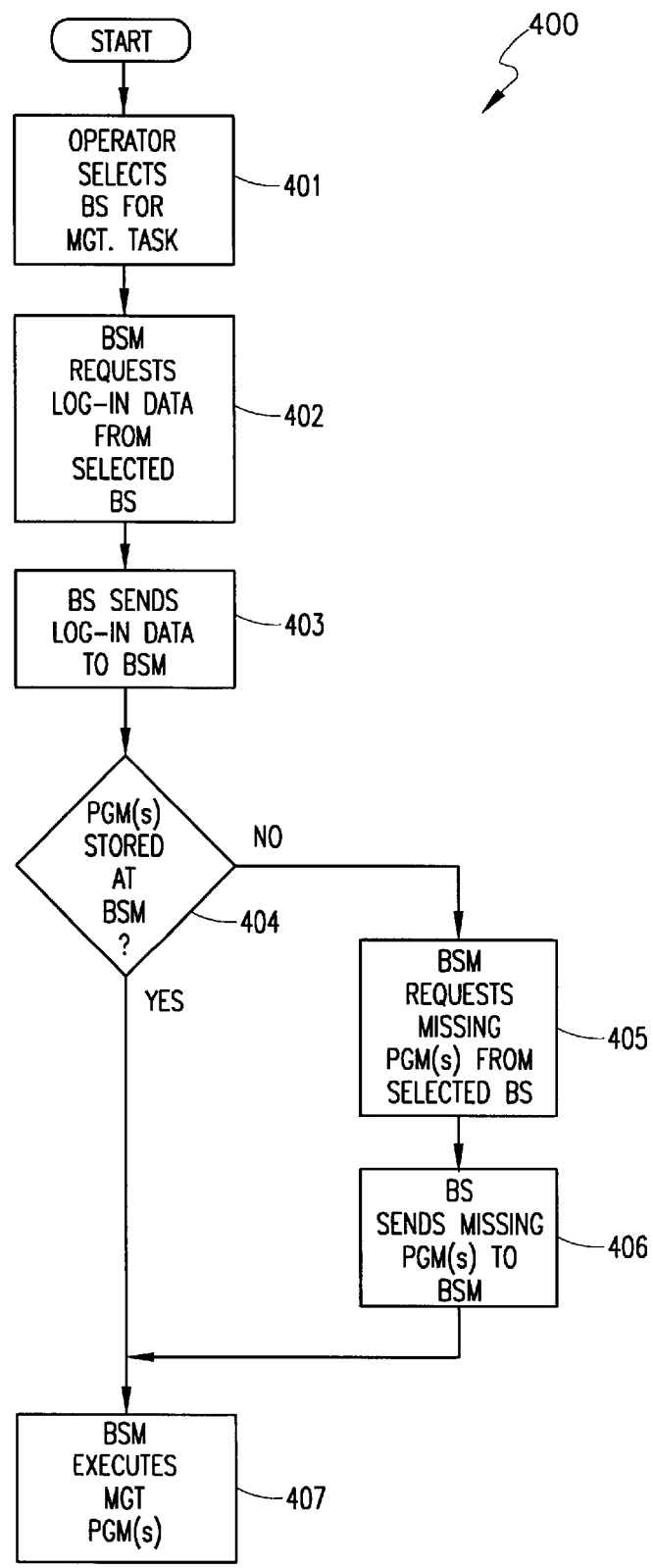
FIG. 7 is a flow diagram that illustrates an exemplary method that can be used to implement the preferred embodiment in the exemplary system shown in FIG. 6.

FIG. 6 is a block diagram of an exemplary system (300) that can be used to implement the preferred embodiment of the present invention. FIG. 7 is a flow diagram that illustrates an exemplary method (400) that can be used to implement the preferred embodiment in the exemplary system (300) shown in FIG. 6. Referring to FIGS. 6 and 7, an exemplary method for loading and executing BSM software is illustrated. At step 401, in order to initiate a management operation or task, a system operator can start a BSM program in a computer 302 (located, for example, in a central network management center, or at a BS). However, for example, the program functions for BSM 215 and the system operator display functions for the computer 302 can be executed in the same computer or in different computers. The operator selects a BS for which a management operation or task is to be performed (e.g., BS 218a in FIG. 5). For example, such an operation or task may be for the purpose of modifying system configuration parameters or reading out performance statistics data. At step 402, in response to the BSM software application started by the operator, the BSM system (e.g., BSM 215 in FIG. 5) establishes communications with the selected BS (218a) via a management data communication network (including an Mub 217), and requests, for example, "BS log-in initial data". The selected BS responds to the BSM's request by sending the requested data to the BSM (via the management data communication network including an Mub), if it is possible to perform the operation or task requested. This data includes, for example, information about which management program modules should be loaded and/or executed in the BSM to perform the actual management operations or tasks desired. The BSM log-in data can also include other information, such as a request for the BSM to perform an authentication procedure (e.g., send a password to the BS, or similar operation).

At step 403, assuming that it is possible to perform the operation or task requested by the operator, the selected BS (218a) transmits the initial log-in data to the BSM (via the Mub and the management data communication network). At step 404, the BSM 215 (software) checks to determine if the required applications (programs) intended to perform the requested operations or tasks are stored locally. If not, then at step 405, the BSM sends a request (via an Mub and management data communication network) to the selected BS (218a), for the BS to convey the needed program(s) back to the BSM. In response, at step 406, the selected BS sends the needed program(s) unit(s) or module(s) to the BSM via the management data communication network.

At step 407, the BSM's processor initiates execution of the programs(s) needed for performance of the management operations or tasks for the selected BS and as requested by the operator. For example, the program(s) executing in the BSM can start up an interactive dialogue with the operator via a graphical user interface (via the computer 302), and a dialogue with the selected BS in accordance with an established management protocol carried via the management data communication network 217. Advantageously, in accordance with the present invention, the above-described method enables an operator to "log-in" to a BS of any type from any computer that is connected to the management data communication network. This method also makes it possible for different operators at different locations to "log-in" to the same BS primarily for the purpose of performing management operations or tasks. Notably, the management data communication network 217 can be implemented in any one of a number of different ways, such as, for example, by using Internet protocols like TCP/IP or HTML. Such a network could be denoted as a form of "management intranet". In this case, a number of existing products may be used for execution of the management operations or tasks, such as, for example, conventional Web-browsers, a Java®-like execution environment, etc.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for managing different types of radio base stations in a cellular communication network, comprising the steps of:
   storing, in at least one of said different types of radio base stations, at least one management service software application; and
   determining, by a base station manager, if said at least one management service software application is stored locally;
   directing said at least one of said different types of radio base stations to convey said at least one management service software application to said base station manager, if said base station manager determines that said at least one said management service software application is not locally stored;
   executing, by at least one of said different types of radio base stations, said at least one management service software application in response to a directive from the base station manager.

2. The method of claim 1, further comprising the step of storing a plurality of management service software applications by each of said different types of radio base stations, each of said plurality of management service software applications executable by a specific one of said different types of radio base stations.

3. The method of claim 1, wherein said cellular communication network comprises a UMTS network.

4. The method of claim 1, wherein said cellular communication network comprises an IMT 2000 network.

5. The method of claim 1, wherein said cellular communication network comprises a GSM network.

6. The method of claim 1, wherein said executing step comprises executing said at least one management service software application with a control computer of at least one of said different types of radio base stations.

7. The method of claim 1, wherein said directive comprises a message from a base station manager.

8. A method for managing different types of radio base stations in a cellular communication network, comprising the steps of:
   storing, in at least one of said different types of radio base stations, at least one management service software application; and
   retrieving, by a base station manager, said at least one management service software application from said at least one of said different types of radio base stations, and executing said at least one management service software application;

determining, by said base station manager, if a second management service software application is stored locally;

directing said at least one of said different types of radio base stations to convey said second management service software application to said base station manager, if said base station manager determines that said second management service software application is not locally stored; and executing said second management service software application.

9. The method of claim 8, wherein said at least one management software service application is written in Java.

10. The method of claim 8, wherein said second management service software application is written in Java.

11. A method for managing different types of radio base stations in a cellular communication network, comprising the steps of:

selecting, by at least one network management operator, a radio base station from said different types of radio base stations;

requesting, by a base station manager, log-in data from said selected radio base station;

conveying, by said selected radio base station, said log-in data to said base station manager;

determining, by said base station manager, if a management program unit is stored locally in response to said log-in data;

requesting, by said base station manager, said management program unit from said selected radio base station if said base station manager determines that said management program unit is not stored locally; and executing said management program unit.

12. The method of claim 11, wherein said log-in data includes a list of management program units associated with a predetermined management task identified by said network management operator.

13. The method of claim 11, wherein the executing step includes maintaining an interactive dialog with said network management operator via a graphical user interface.

14. The method of claim 11, wherein the executing step includes maintaining a dialog with said selected radio base station via a management protocol.

15. The method of claim 11, wherein said management program unit is written in a language that can be interpreted by a virtual execution machine in said base station manager.

16. A system for managing different types of radio base stations in a cellular communication network, comprising:

at least one radio base station of said different types of radio base stations, said at least one radio base station including memory for storing at least one management service software application, a first radio base station;

a base station manager located at said first radio base station for determining, by a base station manager, if said at least one management service software application is stored locally;

directing said at least one of said different types of radio base stations to convey said at least one management service software application to said base station manager, if said base station manager determines that said at least one said management service software application is not locally stored; and said first radio base station operable to execute said at least one management service software application responsive to a directive from said base station manager.

17. The system of claim 16, wherein each of said different types of radio base stations includes memory for storing a plurality of management service software applications, such that each of said plurality of management service software applications is executable by a specific one of said different types of radio base stations.

18. The system of claim 16, wherein said cellular communication network comprises a UMTS network.

19. The system of claim 16, wherein said cellular communication network comprises an IMT 2000 network.

20. The system of claim 16, wherein said cellular communication network comprises a GSM network.

21. The system of claim 16, wherein said at least one radio base station is operable to execute said at least one management service software application with a control computer of said at least one radio base station.

22. The system of claim 16, wherein said directive comprises a message from a base station manager.

* * * * *